(12) United States Patent
Belisle et al.

(10) Patent No.: US 12,394,918 B2
(45) Date of Patent: Aug. 19, 2025

(54) DIELECTRIC FOREIGN OBJECT DEBRIS PROTECTION COVER WITH INTEGRAL WASHER

(71) Applicant: Hamilton Sundstrand Corporation, Charlotte, NC (US)

(72) Inventors: Francis C. Belisle, Beloit, WI (US); Deron J. Staas, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 494 days.

(21) Appl. No.: 17/744,250

(22) Filed: May 13, 2022

(65) Prior Publication Data
US 2023/0369785 A1 Nov. 16, 2023

(51) Int. Cl.
*H01R 9/22* (2006.01)
*H02K 5/22* (2006.01)

(52) U.S. Cl.
CPC .............. *H01R 9/223* (2013.01); *H02K 5/225* (2013.01)

(58) Field of Classification Search
CPC .... H01R 9/223; H01R 9/2408; H01R 9/2416; H01R 11/284; H01R 11/289; H01R 4/22; H01R 4/70; H01R 4/40; H01R 4/62; H01R 4/64; H01R 13/533
USPC ................................................ 439/519–522
See application file for complete search history.

(56) References Cited

U.S. PATENT DOCUMENTS

| | | | | |
|---|---|---|---|---|
| 4,722,701 A * | 2/1988 | Bradt | ................... | H01H 85/205 439/724 |
| 5,599,211 A * | 2/1997 | Kurahashi | ................ | H01R 4/40 439/806 |
| 6,398,595 B2 | 6/2002 | Wakata et al. | | |
| 8,313,343 B2 | 11/2012 | Grosskopf et al. | | |
| 2004/0043644 A1 * | 3/2004 | DiBene, II | ............. | H01R 12/52 439/74 |
| 2008/0063026 A1 | 3/2008 | Roche | | |
| 2010/0203748 A1 * | 8/2010 | Wason | ...................... | H01R 4/64 439/98 |
| 2014/0294207 A1 | 10/2014 | Siegel | | |
| 2017/0170579 A1 * | 6/2017 | Martin | .................. | F24S 25/636 |

(Continued)

FOREIGN PATENT DOCUMENTS

| | | |
|---|---|---|
| DE | 102014221795 A1 | 4/2016 |
| JP | H05298953 A | 11/1993 |

(Continued)

OTHER PUBLICATIONS

Search Report issued in European Patent Application No. 23172884.1; Application Filing Date May 11, 2023; Date of Mailing Oct. 11, 2023 (8 pages).

*Primary Examiner* — Tulsidas C Patel
*Assistant Examiner* — Carlos E Lopez-Pagan
(74) *Attorney, Agent, or Firm* — CANTOR COLBURN LLP (57) ABSTRACT

A foreign object debris (FOD) protection cover includes a dielectric barrier assembly having an integrated washer. The dielectric barrier assembly includes a base and one or more barrier walls integrally formed with the base. The washer is integrally formed in the base and includes a hole extending radially about a center axis of the washer. The base and the barrier wall of the dielectric barrier assembly are formed from a dielectric material, and the washer is formed from an electrically conductive material.

16 Claims, 5 Drawing Sheets

(56) References Cited

U.S. PATENT DOCUMENTS

| | | | | |
|---|---|---|---|---|
| 2018/0366713 A1* | 12/2018 | Nakayama | .......... | H01M 50/591 |
| 2021/0226358 A1* | 7/2021 | Yamamoto | ............. | H01R 4/302 |
| 2023/0119582 A1* | 4/2023 | Belisle | ..................... | H01R 4/36 |
| | | | | 439/709 |

FOREIGN PATENT DOCUMENTS

| | | | |
|---|---|---|---|
| JP | 2021118138 A | | 8/2021 |
| WO | 2016203589 A1 | | 12/2016 |

* cited by examiner

DIELECTRIC FOREIGN OBJECT DEBRIS PROTECTION COVER WITH INTEGRAL WASHER

BACKGROUND

Embodiments of the present disclosure relate generally to power distribution networks, and more particularly, to a foreign object debris protection cover.

The design approaches for foreign object debris (FOD) fault prevention and protection within electrical products are a combination of physical spacing and insulation materials added. As voltages increase and spacing constraints are increased the addition of secondary insulation materials or parts takes up room and has risk of not being used correctly in assembly or re-assembly. Power distribution equipment with large gauge wires and bus bars requires the bolted joints be properly assembled and easily accessed for installation, which is complicated if there are requirements to add additional pieces of installation or dielectric barriers in the assembly.

BRIEF DESCRIPTION

According to a non-limiting embodiment, a foreign object debris (FOD) protection cover comprises a dielectric barrier assembly and one or more integrated washers. The dielectric barrier assembly comprises an upper surface, a lower surface, and one or more upper barrier walls. The upper surface is located opposite the lower surface opposite the upper surface such that each of the upper and lower surfaces extend along a first axis and a second axis orthogonal to the first axis to define a base dielectric barrier assembly. The upper barrier walls are integrally formed with the base. Each of the upper barrier walls includes an upper-surface end extending from the base in a first direction along a third axis that is orthogonal to the first and second axes to a top end located above the lower surface and the upper surface. Each washer extends radially about a center axis and is integrally formed in the base such that it is fixed thereto. Each washer includes a hole that is formed therethrough the washer and that extends radially from the center axis. Each washer includes an inner surface and an outer surface located opposite the inner surface and separated therefrom by the washer. The inner surface is directly exposed to the hole and the outer surface directly contacting the base and integrally formed therewith. The base and each barrier wall comprises a dielectric material, and the each washer comprises an electrically conductive material.

Additionally or alternatively, in this or other embodiments the at least one washer includes an inner surface and an outer surface located opposite the inner surface and is separated therefrom by the at least one washer, the inner surface directly exposed to the hole and the outer surface directly contacting the base and integrally formed therewith.

Additionally or alternatively, in this or other embodiments the at least one upper barrier wall extends along a full length of the base.

Additionally or alternatively, in this or other embodiments the at least one upper barrier wall includes a plurality of upper barrier walls. A first upper barrier wall and a second upper barrier wall among the plurality of upper barrier walls define an upper access opening to provide access to the hole.

Additionally or alternatively, in this or other embodiments a first upper barrier wall and a second upper barrier wall among the plurality of upper barrier walls are integrally formed together to define an upper barrier corner.

Additionally or alternatively, in this or other embodiments at least one lower barrier wall is integrally formed with the base. The at least one lower barrier wall includes a lower-surface base end extending along the third axis in a second direction opposite the first direction from the base to a lower end located below the upper surface and the lower surface.

Additionally or alternatively, in this or other embodiments the at least one lower barrier wall extends along the full length of the base.

Additionally or alternatively, in this or other embodiments the at least one lower barrier wall includes a plurality of lower barrier walls. A first lower barrier wall and a second lower barrier wall among the plurality of lower barrier walls defines a lower access opening therebetween to provide access to the hole.

Additionally or alternatively, in this or other embodiments a first lower barrier wall and a second lower barrier wall among the plurality of lower barrier walls are integrally formed together to define a lower barrier corner.

Additionally or alternatively, in this or other embodiments the at least one barrier wall is configured to block a line-of-sight to one or more electrical conductors located adjacent to the dielectric barrier assembly.

According to another non-limiting embodiment, a power distribution assembly comprises an electrical conductor and a foreign object debris (FOD) protection cover including a dielectric barrier assembly having at least one integrated washer. The electrical conductor includes an opening configured to conduct electrical current therethrough. The dielectric barrier assembly comprises an upper surface and a lower surface opposite the upper surface. The upper and lower surfaces extend along a first axis and a second axis orthogonal to the first axis to define a base that is disposed on the electrical conductor. At least one upper barrier wall is integrally formed with the base. The at least one upper barrier wall includes an upper-surface end extending from the base in a first direction along a third axis that is orthogonal to the first and second axes to a top end located above the lower surface and the upper surface. The at least one washer is integrally formed in the base such that the washer is fixed thereto. The at least one washer contacts the electrical conductor and includes a hole that extends radially from a center axis and that is aligned with respect to the opening of the electrical conductor. A fastener extends through the hole and the opening, and is configured to couple the dielectric barrier assembly together with the electrical conductor.

Additionally or alternatively, in this or other embodiments a second electrical conductor is configured to conduct electrical current therethrough and is disposed on the first electrical conductor to establish physical contact therewith. The second electrical conductor includes a second opening that is vertically aligned with the opening of the first conductor.

Additionally or alternatively, in this or other embodiments an electrically conductive path is established from the first electrical conductor to the second electrical conductor.

According to yet another non-limiting embodiment, a power distribution network comprises a first power distribution assembly and a second power distribution assembly located adjacent the first power distribution assembly. The first power distribution assembly comprises a first electrical conductor configured to conduct electrical current therethrough and a first foreign object debris (FOD) protection cover first that includes first dielectric barrier assembly. The first dielectric barrier assembly comprises a first base, at least one first upper barrier wall integrally formed with the first base, and a first washer extending radially about a first center axis and integrally formed in the first base such that the first washer is fixed thereto. The first washer includes a first hole formed therethrough and extending radially from the first center axis. The second power distribution assembly comprises a second electrical conductor configured to conduct electrical current therethrough, and a second foreign object debris (FOD) protection cover that includes a second dielectric barrier assembly. The second dielectric barrier assembly is located a distance away from the first dielectric barrier assembly to define a line-of-sight between the first and second dielectric barrier assemblies. The second dielectric barrier assembly comprises a second base, at least one second upper barrier wall integrally formed with the second base, and a second washer extending radially about a second center axis and integrally formed in the second base such that the second washer is fixed thereto. The second washer includes a second hole formed therethrough and extending radially from the second center axis.

Additionally or alternatively, in this or other embodiments the at least one second upper barrier wall extends into the line-of-sight and is located between the first base of the first dielectric barrier assembly and the second base of the second dielectric barrier assembly.

Additionally or alternatively, in this or other embodiments each the first and second power distribution assemblies further comprises an upper surface and a lower surface opposite the upper surface. The upper and lower surfaces extend along a first axis and a second axis orthogonal to the first axis to define a base that is disposed on the first and electrical conductors, respectively.

Additionally or alternatively, in this or other embodiments each of the at least one first upper barrier wall and the at least one second upper barrier wall further includes an upper-surface end. The upper surface end extends from the first and second base, respectively, in a first direction along a third axis that is orthogonal to the first and second axes to a top end located above the lower surface and the upper surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Referring to FIGS. 1-4, a foreign object debris (FOD) protection cover 100 is illustrated according to a non-limiting embodiment. The FOD protection cover 100 includes a dielectric barrier assembly 102 and a metallic (load bearing) washer 200 integrally formed (retained) with the dielectric barrier assembly 102. Although the FOD protection cover 100 is illustrated as having a single washer 200, it should be appreciated that the FOD protection cover 100 can include two or more washers 200 without departing from the scope of the invention.

The dielectric barrier assembly 102 includes a base 104 and one or more upper barrier walls 106. Although two upper barrier walls 106 are illustrated, the dielectric barrier assembly 102 can include more or less upper barrier walls 106 without departing from the invention. The base 104 and each upper barrier wall 106 are formed from a dielectric material. The dielectric material can be any electrically non-conductive material or electrically isolating material. In one or more non-limiting embodiments, the dielectric material includes various plastics, polymers, or electrically non-conductive ceramics.

The base 104 has an upper surface 108 and a lower surface 110 opposite the upper surface 108. The base 104 extends along a first axis (e.g., an X-axis) to define a first side (e.g., side 111) of the base 104 and a second axis (e.g., a Y-axis) orthogonal to the first axis to define a second side of the base 104.

Each upper barrier wall 106 is integrally formed with the base 104. In one or more non-limiting embodiments, the base 104 and the upper barrier walls 106 could be formed using various additive manufacturing techniques such as, for example, three-dimensional (3D) printing. In this manner, the base 104 and upper barrier walls 106 can be seamlessly and integrally formed together with one another.

Each upper barrier wall 106 includes an upper-surface end 112 and a top end 114. The upper-surface end 112 extends from the base 104 in a first direction along a third axis (e.g., a Z-axis) that is orthogonal to the first and second axes to the top end 114, which is located above the lower surface 110 and the upper surface 108. In one or more non-limiting embodiments, one or more of the upper barrier walls 106 extends along the entire side (e.g., a full length) of the base 104.

The washer 200 is integrally formed in the base 104 and is fixed thereto. As described herein although one washer 200 is shown, it should be appreciated that a plurality of washers 200 can be formed in the base 104 and spaced apart from one another by a portion of the base 104. In one or more non-limiting embodiments, the base 104 and the washer 200 are formed using various additive manufacturing techniques such as, for example, three-dimensional (3D) printing. In this manner, the base 104 and washer 200 can be seamlessly and integrally formed together with one another.

The washer 200 extends radially about a center axis (C-C) and includes a hole 202 formed therethrough that extends radially from the center axis (C-C). Although the hole 202 is illustrated as having a circular profile with a circumference, it should be appreciated that the hole 202 can have any shape or profile without departing from the scope of the invention.

The washer 200 can be formed from various materials including, but not limited to, an electrically conductive material. The electrically conductive material can include, but is not limited to, steel, brass, aluminum, and copper. The washer 200 includes a top surface 204 and bottom surface 210 that extends between an inner edge 206 and an outer edge 208 opposite the inner edge 206. In one or more non-limiting embodiments, the outer edge 208, top surface 204 and/or bottom surface 210 directly contacts the base 104 and is integrally formed therewith.

Figure 1:
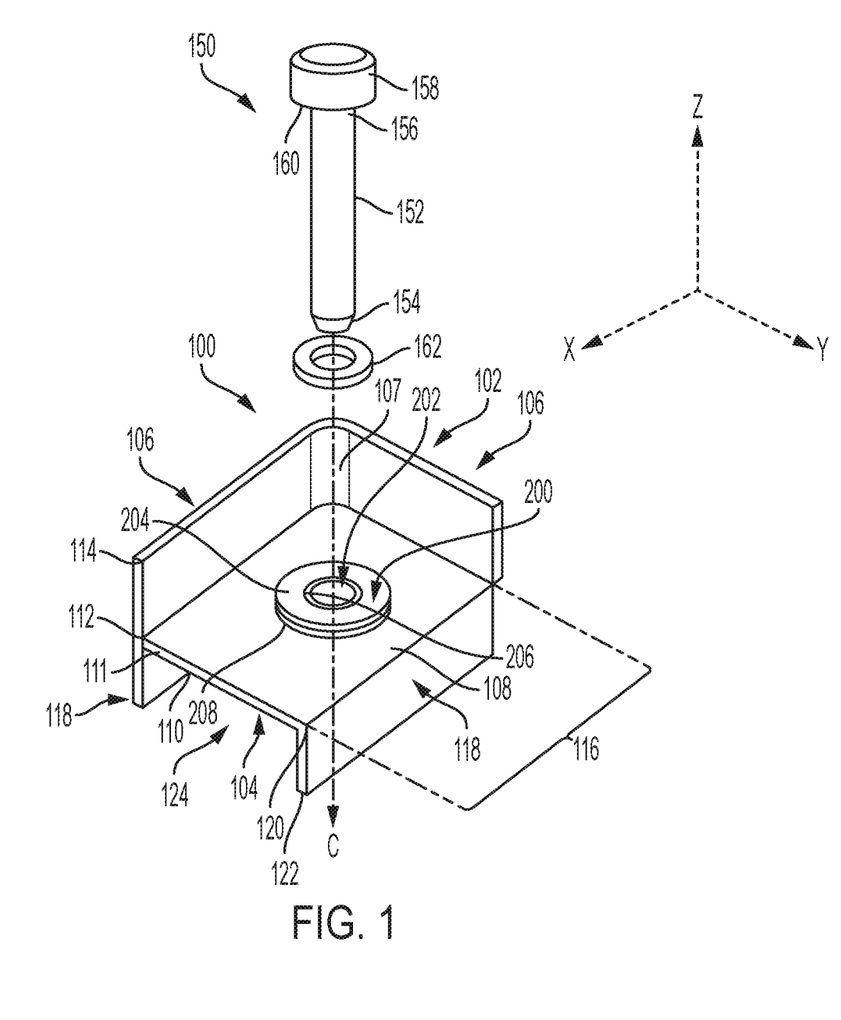
FIG. 1 is a perspective view of a dielectric foreign object debris object protection cover with an integral electrically conductive washer according to a non-limiting embodiment of the present disclosure.

As illustrated in the non-limiting embodiment illustrated in FIG. 1, for example, the FOD protection cover 100 can include a dielectric barrier assembly 102 with a plurality of upper barrier walls 106 that define one or more upper access openings 116. The upper access opening 116 provides access to the internal area of the FOD protection cover 100. In this manner, a maintenance technician can access components located within the internal area and/or a fastener 150 that is disposed in the hole 202. In one or more non-limiting embodiments, a first upper barrier wall 106 and a second upper barrier wall 106 are integrally formed together to define an upper barrier corner 107.

As illustrated in the non-limiting embodiment illustrated in FIG. 1, for example, the FOD protection cover 100 can further include one or more lower barrier walls 118 integrally formed with the base 104. Each lower barrier wall 118 is integrally formed with the base 104. In one or more non-limiting embodiments, the base 104 and the upper barrier walls 118 could be formed using various additive manufacturing techniques such as, for example, three-dimensional (3D) printing. In this manner, the base 104 and lower barrier walls 118 can be seamlessly and integrally formed together with one another.

Each lower barrier wall 118 includes a lower-surface end 120 and a lower end 122. The lower-surface end 120 extends from the base 104 in a second direction (opposite the direction of the upper-surface walls 106) along the third axis (e.g., a Z-axis) to the lower end 122, which is located below the upper surface 108 and the lower surface 110. In one or more non-limiting embodiments, one or more of the lower barrier walls 106 extends along the entire side (e.g., a full length) of the base 104.

As illustrated in the non-limiting embodiment illustrated in FIG. 1, for example, the dielectric barrier assembly 102 can include a plurality of lower barrier walls 118 that define one or more lower access openings 124. The lower access opening 124 provides access to a lower internal area of the FOD protection cover 100. In this manner, a maintenance technician can access components located within the lower internal area and/or the fastener 150 that is disposed in the hole 202.

Figure 2:
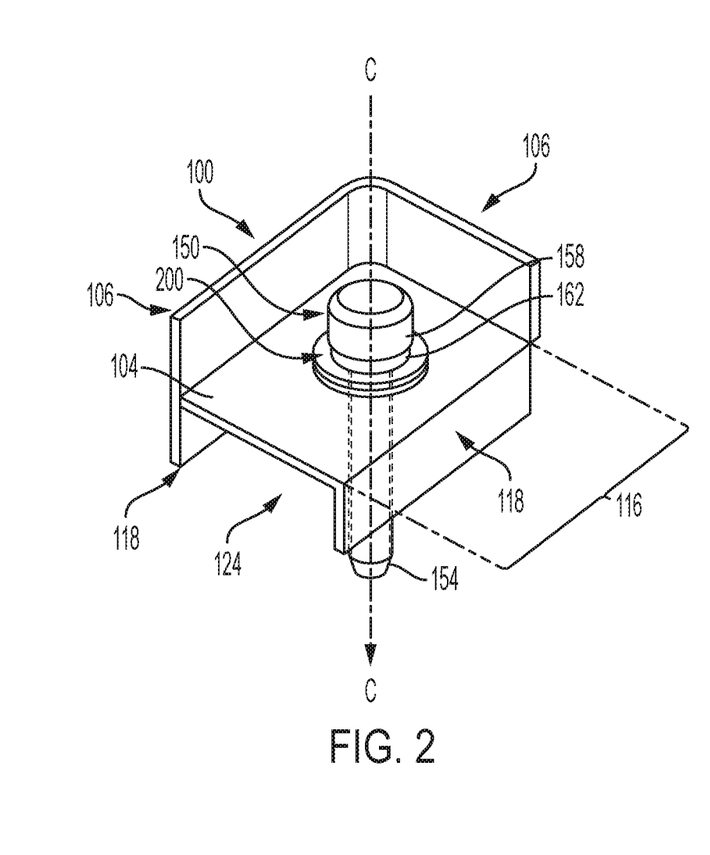
FIG. 2 is a perspective view of the dielectric foreign object debris object protection cover with an integral electrically conductive washer shown in FIG. 1 including a fastener disposed therein according to a non-limiting embodiment of the present disclosure.
Figure 3:
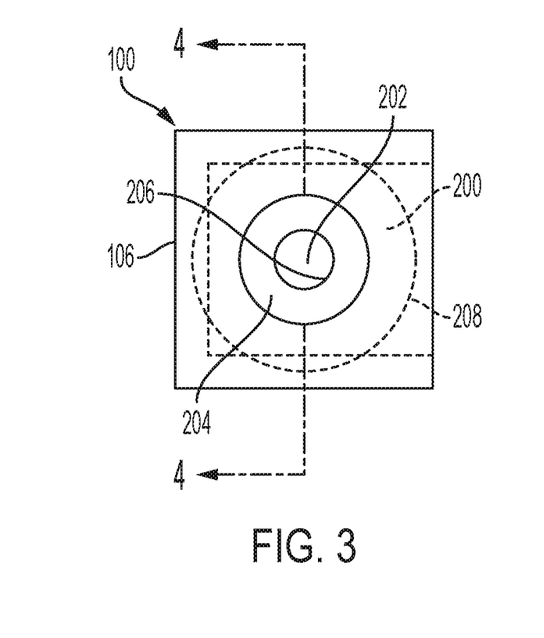
FIG. 3 is a top view of the dielectric foreign object debris object protection cover with an integral electrically conductive washer shown in FIG. 2 according to a non-limiting embodiment of the present disclosure.
Figure 4:
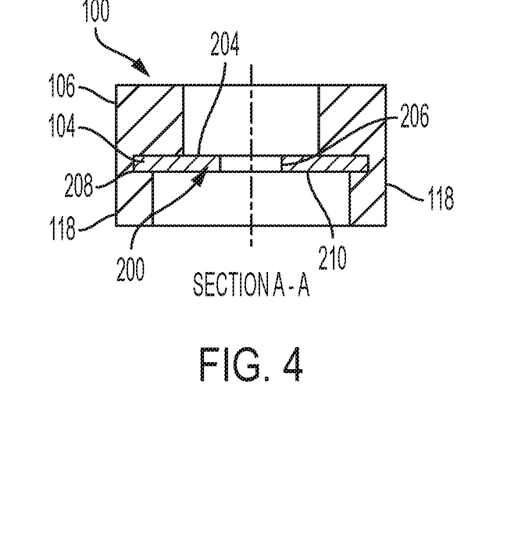
FIG. 4 is a cross-sectional view of the dielectric foreign object debris object protection cover with an integral electrically conductive washer shown in FIG. 3 taken along line A-A according to a non-limiting embodiment of the present disclosure.

Although FIG. 1 shows a first lower barrier wall 118 separate from a second lower barrier wall 118, it should be appreciated that first and second barrier walls 118 can be integrally formed together to define a lower barrier corner With continued reference to FIG. 1 along with additional reference to FIG. 2, the washer 200 is configured to receive a fastener 150 having a portion that extends through the hole 202. The fastener 150 can include, but is not limited to, a screw, a bolt, a pin. The fastener 150 includes a body 152 (see FIG. 1) extending from a lower fastener end 154 to an upper fastener end 156 see FIG. 1). A fastener head 158 is formed on the upper fastener end 156 and extends laterally therefrom. Accordingly, the fastener can be disposed through the hole 202 such that a lower surface 160 of the fastener head 158 sits on the washer 200. In one or more non-limiting embodiment, the lower surface 160 directly contacts the washer 200. In other embodiments, an additional washer (e.g. a locking washer or a spring washer) 162 can be disposed between the fastener head 158 and the washer 200.

In one or more non-limiting embodiments, one or more of the upper barrier walls 106 extends above the fastener head 158. In this manner, one or more of the upper barrier walls 106 can prevent a foreign object from falling into internal area of the FOD protection cover 100 and contacting the fastener 150. The upper barrier walls 106 can therefore prevent an electrically short from occurring when the foreign object and the fastener 150 are formed from an electrically conductive material and the fastener 150 is in contact with an electrical conductor such as for example, a bus bar or electrically conductive wire.

In one or more non-limiting embodiments, one or more of the lower barrier walls 118 extend below the lower fastener end 154. In this manner, one or more of the lower barrier walls 118 can prevent a foreign object from entering into the internal area of the FOD protection cover 100 and contacting the fastener 150. The lower barrier walls 118 can therefore prevent an electrical short from occurring when a foreign object and the fastener 150 are formed from an electrically conductive material and the fastener 150 is in contact with an electrical conductor such as for example, a bus bar or electrically conductive wire.

Figure 5:
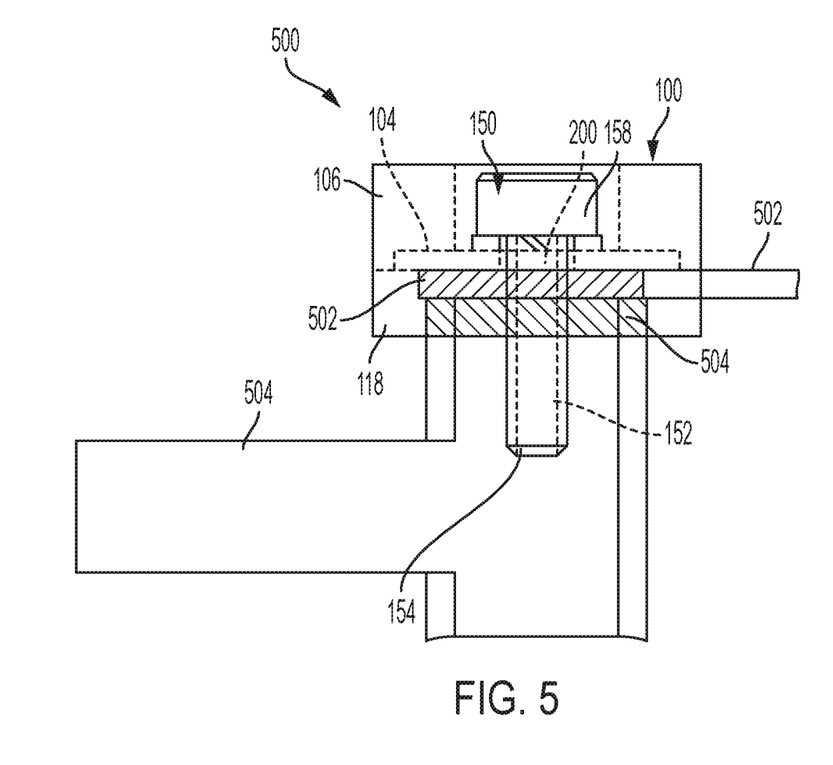
FIG. 5 is a side view of a power distribution assembly including a dielectric foreign object debris object protection cover with an integral electrically conductive washer according to a non-limiting embodiment of the present disclosure.

Turning now to FIG. 5, a power distribution assembly 500 is illustrated according to a non-limiting embodiment. The power distribution assembly 500 includes a FOD protection cover 100 with a dielectric barrier assembly 102 configured to cover more electrical conductors 502 and 504. The dielectric barrier assembly 102 is constructed according to the dielectric barrier assembly 102 described above. Therefore, details of the dielectric barrier assembly 102 will not be repeated for the sake of brevity.

The electrical conductors 502 and 504 can include, but are not limited to, a bus bar, an electrical wire, an electrical cable, or any other electrical component configured to conduct electrical current. Although two electrical conductors 502 and 504 are illustrated, it should be appreciated that more or less electrical conductors can be included in the 500 without departing from the scope of the invention.

The first electrical conductor includes a first opening that is aligned with the hole 202 of the washer 200 and is configured to receive the body 152 of the fastener 150. The second electrical conductor 504 is disposed on the first electrical conductor 502 and establishes physical contact therewith. In this manner, an electrically conductive path is established from the first electrical conductor to the second electrical conductor. The second electrical conductor 504 includes a second opening that is vertically aligned with the first opening of the first conductor and the washer hole 202 to receive the body 152 that is fitted through the washer hole 202. Accordingly, the fastener 150 extends through the washer hole 202, the first electrical conductor opening, and the second electrical conductor opening to couple the dielectric barrier assembly 102 together with the first and second electrical conductors 502 and 504.

As described herein, one or more of the upper barrier walls 106 extends above the fastener head 158 to prevent foreign objects from falling into internal area of the FOD protection cover 100 and contacting the fastener 150. Similarly, one or more of the lower barrier walls 118 extend below the lower fastener end 154 and may also cover the second electrical conductor 504 and/or the first electrical conductor 502. In this manner, one or more of the lower barrier walls 118 can prevent accidental contact with an exposed live, hot, or active portion of the second electrical conductor 504 and/or the first electrical conductor 502.

Figure 6:
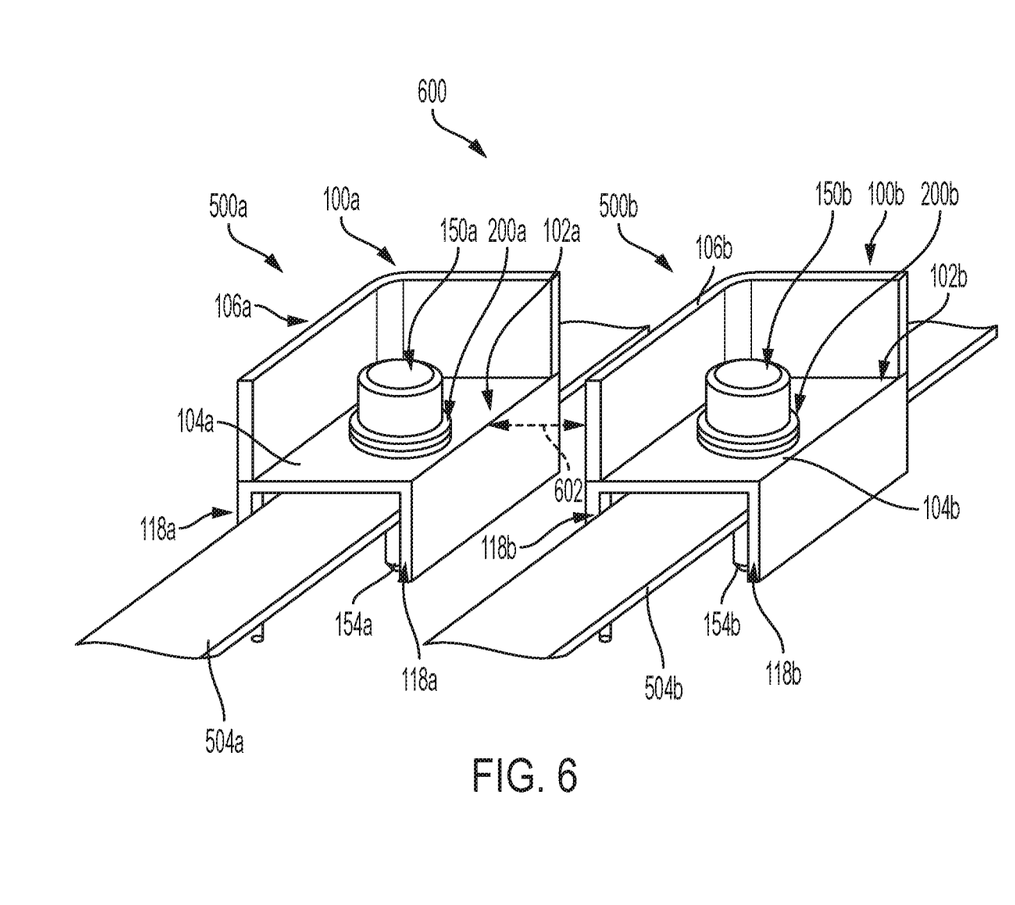
FIG. 6 is a perspective view of a power distribution assembly including a plurality of dielectric foreign object debris object protection covers including an integral electrically conductive washer according to a non-limiting embodiment of the present disclosure.

Turning now to FIG. 6, a power distribution network 600 is illustrated according to a non-limiting embodiment. The power distribution network 600 includes a first power distribution assembly 500a and a second power distribution assembly 500b. The first power distribution assembly 500a includes a first FOD protection cover 100a and the second power distribution assembly 500b includes a second FOD protection cover 100b. The first FOD protection cover 100a includes a first dielectric barrier assembly 102a with a first integrated washer and the second FOD protection cover 100b includes a second dielectric barrier assembly 102b with a second integrated washer. The first and second power distribution assemblies 500a and 500b are constructed similarly to the power distribution assembly 500 shown in FIG. 5 described above. Likewise, the first and second FOD protection covers 100a and 100b are constructed similar to the FOD protection cover 100 shown in FIGS. 1-5 described above. Therefore, details of the first and second FOD protection covers 100a and 100b will not be repeated for the sake of brevity.

According to a non-limiting embodiment, the first power distribution assembly 500a is located a distance away from the second power distribution assembly 500b. Accordingly, a line-of-sight 602 is established between the first and second power distribution assemblies 500a and 500b. A shown in FIG. 6, at least one of the upper barrier walls 106b included with the second FOD protection 100b extends into the line-of-sight 602 and is located between the base 104a of the first FOD protection 100a (i.e., the first dielectric barrier assembly) and the base 104b of the second FOD protection 100b (i.e., the second dielectric barrier assembly). The power distribution network 600 provides an advantage in that if a foreign object falls on top of the power distribution network 600, the upper barrier wall 106b of the second FOD protection 100b can prevent the foreign object physically contacting both the first fastener 150a and the second 150a, thereby preventing a short circuit between the first and second power distribution assemblies 500a and 500b.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A foreign object debris (FOD) protection cover comprising:
   a dielectric barrier assembly comprising:
      an upper surface and a lower surface opposite the upper surface, the upper and lower surfaces extending along a first axis and a second axis orthogonal to the first axis to define a base; and
      at least one upper barrier wall integrally formed and seamless with the base, the at least one upper barrier wall including an upper-surface end extending from the base in a first direction along a third axis that is orthogonal to the first and second axes to a top end located above the lower surface and the upper surface;
      at least one lower barrier wall integrally formed and seamless with the base, the at least one lower barrier wall including a lower-surface base end extending along the third axis in a second direction opposite the first direction from the base to a lower end located below the upper surface and the lower surface; and
      at least one washer extending radially about a center axis and integrally formed and seamless in the base such that the washer is fixed thereto, the at least one washer including a hole formed therethrough and extending radially from the center axis,
   wherein the base, the at least one upper barrier wall, and the at least one lower barrier wall each comprises a dielectric material and the at least one washer comprises an electrically conductive material.

2. The FOD protection cover of claim 1, wherein the at least one washer including an inner surface and an outer surface located opposite the inner surface and separated therefrom by the at least one washer, the inner surface directly exposed to the hole and the outer surface directly contacting the base and integrally formed therewith.

3. The FOD protection cover of claim 1, wherein the at least one upper barrier wall extends along a full length of the base.

4. The FOD protection cover of claim 1, wherein the at least one upper barrier wall includes a plurality of upper barrier walls, a first upper barrier wall and a second upper barrier wall among the plurality of upper barrier walls defining an upper access opening to provide access to the hole.

5. The FOD protection cover of claim 1, wherein the at least one lower barrier wall includes a plurality of lower barrier walls, a first lower barrier wall and a second lower barrier wall among the plurality of lower barrier walls defining a lower access opening therebetween to provide access to the hole.

6. The FOD protection cover of claim 1, wherein the at least one barrier wall is configured to block a line-of-sight to one or more electrical conductors located adjacent to the dielectric barrier assembly.

7. The FOD protection cover of claim 3, wherein a first upper barrier wall and a second upper barrier wall among a plurality of upper barrier walls are integrally formed and seamless together to define an upper barrier corner.

8. The FOD protection cover of claim 4, wherein the at least one lower barrier wall extends along the full length of the base.

9. The FOD protection cover of claim 5, wherein the first lower barrier wall and the second lower barrier wall among the plurality of lower barrier walls are integrally formed and seamless together to define a lower barrier corner.

10. A power distribution assembly comprises:
an electrical conductor including an opening and configured to conduct electrical current therethrough; and
a foreign object debris (FOD) protection cover including a dielectric barrier assembly comprising:
an upper surface and a lower surface opposite the upper surface, the upper and lower surfaces extending along a first axis and a second axis orthogonal to the first axis to define a base that is disposed on the electrical conductor; and
at least one upper barrier wall integrally formed and seamless with the base, the at least one upper barrier wall including an upper-surface end extending from the base in a first direction along a third axis that is orthogonal to the first and second axes to a top end located above the lower surface and the upper surface;
at least one lower barrier wall integrally formed and seamless with the base, the at least one lower barrier wall including a lower-surface base end extending along the third axis in a second direction opposite the first direction from the base to a lower end located below the upper surface and the lower surface; and
at least one washer integrally formed and seamless with the base such that the washer is fixed thereto, the at least one washer contacting the electrical conductor and including a hole that extends radially from a center axis and that is aligned with respect to the opening of the electrical conductor; and
a fastener extending through the hole and the opening and configured to couple the dielectric barrier assembly together with the electrical conductor.

11. The power distribution assembly of claim 10, further comprising a second electrical conductor configured to conduct electrical current therethrough, the second electrical conductor disposed on the first electrical conductor to establish physical contact therewith and including a second opening that is vertically aligned with the opening of the first conductor.

12. The power distribution assembly of claim 11, wherein the physical contact establishes an electrically conductive path from the first electrical conductor to the second electrical conductor.

13. A power distribution network comprises:
a first power distribution assembly comprising:
a first electrical conductor configured to conduct electrical current therethrough; and
a first foreign object debris (FOD) protection cover including a first dielectric barrier assembly comprising:
a first base;
at least one first upper barrier wall integrally formed and seamless with the first base; and
a first washer extending radially about a first center axis and integrally formed and seamless with the first base such that the first washer is fixed thereto, the first washer including a first hole formed therethrough and extending radially from the first center axis;
a second power distribution assembly adjacent the first power distribution assembly, the second power distribution assembly comprising:
a second electrical conductor configured to conduct electrical current therethrough; and
a second foreign object debris (FOD) protection cover including a second dielectric barrier assembly a distance away from the first dielectric barrier assembly to define a line-of-sight between the first and second dielectric barrier assemblies, the second dielectric barrier assembly comprising:
a second base;
at least one second upper barrier wall integrally formed and seamless with the second base; and
a second washer extending radially about a second center axis and integrally formed and seamless with the second base such that the second washer is fixed thereto, the second washer including a second hole formed therethrough and extending radially from the second center axis.

14. The power distribution network of claim 13, wherein the at least one second upper barrier wall extends into the line-of-sight and is located between the first base of the first dielectric barrier assembly and the second base of the second dielectric barrier assembly.

15. The power distribution network of claim 14, wherein each the first and second power distribution assemblies further comprises an upper surface and a lower surface opposite the upper surface, the upper and lower surfaces extending along a first axis and a second axis orthogonal to the first axis to define a base that is disposed on the first and electrical conductors, respectively.

16. The power distribution network of claim 15, wherein each of the at least one first upper barrier wall and the at least one second upper barrier wall further includes an upper-surface end extending from the first and second base, respectively, in a first direction along a third axis that is orthogonal to the first and second axes to a top end located above the lower surface and the upper surface.

* * * * *